Feb. 4, 1941. J. B. HANSELL 2,230,945
ALTERNATING CURRENT VOLTAGE REGULATOR
Filed Nov. 4, 1938 4 Sheets-Sheet 1
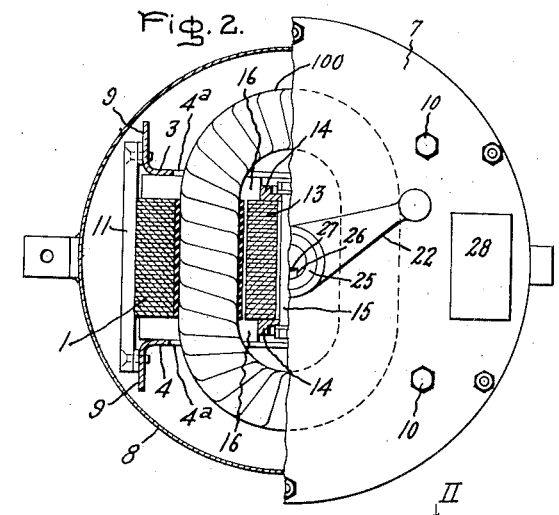
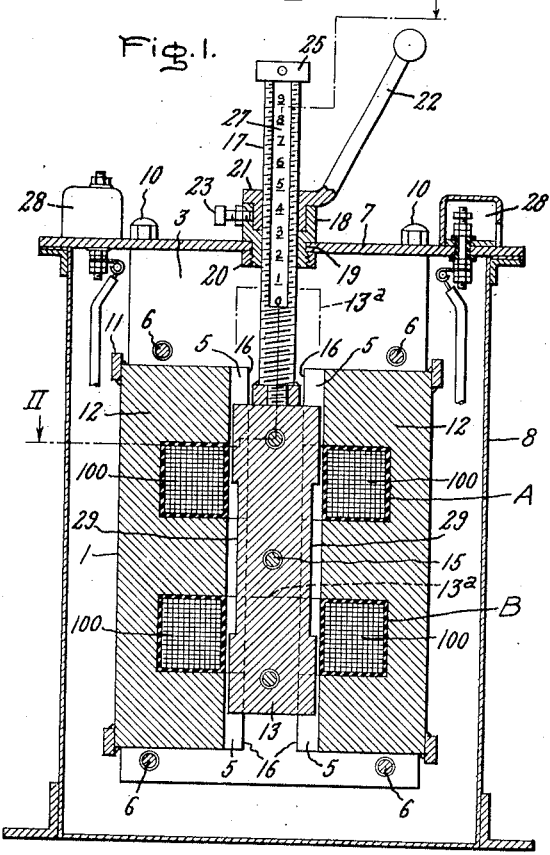
Inventor:
John B. Hansell,
by Harry E. Dunham
His Attorney.

Feb. 4, 1941.  J. B. HANSELL  2,230,945
ALTERNATING CURRENT VOLTAGE REGULATOR
Filed Nov. 4, 1938  4 Sheets-Sheet 2

Inventor:
John B. Hansell,
by Harry E. Dunham
His Attorney.

Feb. 4, 1941.   J. B. HANSELL   2,230,945
ALTERNATING CURRENT VOLTAGE REGULATOR
Filed Nov. 4, 1938   4 Sheets-Sheet 3

Inventor:
John B. Hansell,
by Harry E. Dunham
His Attorney.

Feb. 4, 1941.   J. B. HANSELL   2,230,945
ALTERNATING CURRENT VOLTAGE REGULATOR
Filed Nov. 4, 1938   4 Sheets—Sheet 4

Inventor:
John B. Hansell,
by Harry E. Dunham
His Attorney.

Patented Feb. 4, 1941

2,230,945

UNITED STATES PATENT OFFICE 2,230,945

ALTERNATING CURRENT VOLTAGE REGULATOR

John Bentley Hansell, Pendleton, England, assignor to General Electric Company, a corporation of New York Application November 4, 1938, Serial No. 238,925
In Great Britain November 17, 1937

4 Claims. (Cl. 171—119)

This invention relates to alternating current voltage regulators.

According to the present invention an alternating current voltage regulator is provided comprising in combination a primary winding including a plurality of coils connected, or adapted to be connected in series across a primary or supply circuit, a magnetic circuit structure providing independent magnetic circuits for said windings and having one or more relatively movable members of magnetic material forming part of said magnetic circuits for each primary winding and adapted to vary the relative reluctances of each of said magnetic circuits, and a secondary winding including one or more coils closely electromagnetically coupled by said magnetic circuit structure with a coil or with respective coils of said primary winding, whereby the relative voltage distribution across said primary coils may be adjusted by relative movement between the parts of said structure, thereby to adjust the voltage or voltages induced in the secondary coil or coils by the associated coil or coils of the primary winding.

As will be understood, the magnetic circuit structure, including the relatively movable member or members thereof, may assume various forms so that the reluctance of the magnetic circuits of the several primary coils are adjustable by relative movement between said structure and said member or members, thereby to adjust the relative voltage distribution between said coils and the relative voltage or voltages induced in the secondary coil or coils, and such relative movement may be effected in any convenient manner, either by manual operation or otherwise.

In a preferred construction of the regulator, according to a further feature of the invention, said regulator comprises a plurality of cores provided with poles projecting towards a central space between said cores, in which space is located one or more core members of magnetic material adapted variably to bridge the gaps between such poles, and the coils of the primary and secondary windings are disposed in the slots between said poles and surround the path of movement of said core member or members, together with means for effecting relative movement between said core member or members and said poles along said central space so as to change the reluctances of the magnetic circuits of said primary coils with respect to one another, and thereby to adjust the distribution of voltage between said primary coils. Preferably two cores are provided with adjacent poles thereof disposed opposite and parallel with one another.

Generally the magnetic circuit structure in which the coils are arranged will be fixed whilst the one or more co-operating cores or members will be movable, although the invention is not limited to such arrangement for obtaining the relative movement between said structure and said core or cores.

In order that the invention may be more fully understood reference will now be made by way of example to the accompanying drawings, in which:

Figure 1 is a sectional side elevation of a preferred construction of the regulator according to the invention.

Fig. 2 is a part sectional plan taken on the line II—II of Fig. 1.

Figure 3:
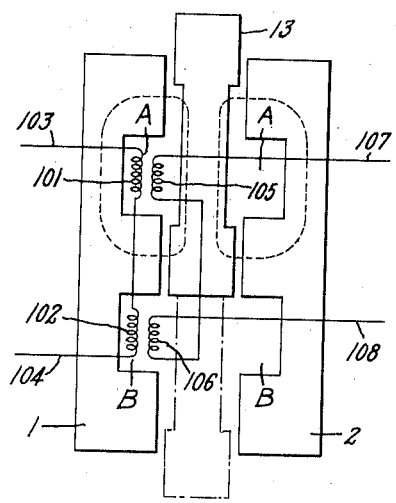

Figs. 3 to 10 inclusive illustrate diagrammatically a number of examples of winding arrangements of the regulator.

Referring first to the preferred embodiment of the invention shown in Figs. 1 and 2, the regulator comprises two fixed laminated cores 1 and 2 which are clamped between side plates 3 and 4 with interposed packing pieces 5 by means of clamping bolts 6. The plates 3 are supported from a cover plate 7 of a cylindrical casing 8 for the regulator, the plates 3 being provided with flanges 9 which are bolted as indicated at 10 to said cover plate. The laminae of the cores 1 and 2 may be located in place by cross bars 11 welded to said laminae and screwed to said flanges 9.

The cores 1 and 2 are each provided with a plurality of poles 12, three such poles being provided in the example shown thereby to form slots or recesses such as A and B in which the coils 100 of the windings of the regulator are disposed, the end plates 4 being provided with openings 4a adjacent the slots A and B for accommodating said windings. A movable core 13 of laminated construction is disposed in the central space between the poles 12 of the two cores, the laminae of the moving core being clamped together between end clamping bars 14 by means of bolts 15. The edges of the bars 14 register with the inner vertical faces at 16 of the packing pieces 5 whereby the core 13 is slidably located between the cores 1 and 2.

A threaded rod 17 is fixedly secured to the upper end of the core 13 so as to carry the latter. This rod is threaded through an operating nut 18 having an extension 19 projecting through a central perforation in the cover plate 7 and secured against axial movement therein by means of a thrust collar 20. The nut 18 is counter-bored at its upper end and receives a boss 21 formed integrally with an operating hand lever 22, the rod 17 extending through the boss 21 and having screwthreaded engagement therewith as well as with the nut 18. The operating lever 22 is thus capable of rotational movement with respect to the nut 18 but is locked in place with respect to said nut by means of a set-screw 23. By this means the screw-thread clearance between the nut 18 and the rod 17 may be taken up so as to prevent chattering of the rod 17 against said nut.

The coils 100 surround the moving core 13 as shown in Fig. 2. The coils of the windings may be connected in various ways as hereinafter indicated but whatever connection is employed it will be seen that with the moving core 13 in its illustrated central position the reluctances of the magnetic circuits for the coils in the slots A will be similar to that of the magnetic circuits for the coils in the slots B. By rotation of the hand lever 22, however, the core 13 may be moved axially with respect to the fixed cores 1 and 2 in either direction. If, for example, the core is raised the reluctance of the magnetic circuit for the coils in the slots A will be reduced, whilst the reluctance of the magnetic circuits for the coils in the slots B will be increased and since the coils comprise coils connected in series with one another across a primary circuit the voltage distribution between said coils will be correspondingly varied, namely when the core 13 is raised from its central position a larger proportion of the primary applied voltage will appear across the primary coil in the slot A than across the primary coil in the slot B, and the voltage or voltages induced in any secondary coil or coils provided in the slot A or in the slot B will be correspondingly affected. On the other hand, if the core 13 is lowered with respect to the cores 1 and 2 then the reluctance of the magnetic circuit for the coils in the slots B becomes less than that of the magnetic circuit of the coils in the slot A so that a greater proportion of the primary applied voltage will now appear across the coils in the slots B than those in the slots A with a consequent change in the voltage or voltages induced in any secondary coil or coils provided in the slot A or slot B.

When the core 13 is raised to its uppermost position as indicated by the chain lines at 13a, the reluctance of the magnetic circuit for the coils in the slot A will be reduced to a minimum whilst that of the magnetic circuit for the coils in the slots B will be increased to a maximum and consequently nearly the whole of the primary applied voltage will appear across the coils in the slots A. Similarly, when the core 13 occupies its lowermost position substantially the whole of the primary applied voltage will appear across the coils in the slots B. It will thus be seen that by operation of the lever 22 the voltage distribution between the coils may be progressively adjusted from the condition in which maximum voltage appears across the primary coil in slots A and maximum voltage is induced in any secondary coil or coils in said slots A to that in which the maximum voltage appears across the primary coil in the slots B and maximum voltage is induced in any secondary coil or coils in said slots B.

The rod 17 may be provided at its upper end with a stop collar 25 for limiting the downward movement of the rod 17 and core 13, and the rod may be calibrated in any suitable manner, for example, by having a slot 26 machined therein which slot is received a scale 27 which may have suitable indications thereon for showing the position of the core 13.

The cover plate 7 may conveniently carry terminal boxes 28 for the connection of the windings in circuit.

Preferably, the moving core 13 is formed of a reduced width over a middle portion of its length, namely at 29 for a purpose which will hereinafter be explained with reference to Figs. 5 and 6.

As will be appreciated, the coils in the fixed cores 1 and 2 may be arranged and connected in various ways according to requirements. In the example illustrated diagrammatically in Fig. 3 in which the fixed cores are each provided with three poles, there is employed a primary winding comprising two coils 101 and 102 connected in series with one another across primary circuit conductors 103 and 104 the coil 101 being wound in the slots A between the upper and centre limbs and the coil 102 being wound in the slots B between the centre and lower limbs of the two cores. A secondary winding is provided comprising two coils 105 and 106, the coil 105 being disposed in the slots A with primary coil 101 and the coil 106 being disposed in the same slots B with the primary coil 102. The secondary coils 105 and 106 are thus closely coupled electromagnetically with the primary coils 101 and 102 respectively. The coils 105 and 106 are connected in series with one another and with output leads 107 and 108.

In operation, with the sliding core 13 in its uppermost position, the reluctance of the magnetic circuit for the coil 101 will be minimum, the flux paths for said coil being as indicated by the broken lines in Fig. 3. On the other hand, the reluctance of the magnetic circuit for the coil 102 will be a maximum since the lower end of the sliding core 13 has been withdrawn completely from said coil. Under these conditions, the voltage across the conductors 103 and 104 appears mainly across the coil 101 and only a small proportion of the applied voltage appears across the coil 102, since the reluctances of the magnetic circuits of the coils 101 and 102 are respectively small and large. As a result, substantially no voltage is induced in the secondary coil 102 whilst maximum voltage is induced in the secondary coil 101 and the output leads 107 and 108 and apparatus connected therewith will be energised accordingly. If now the core 13 is lowered, the reluctance of the magnetic circuit for the coil 101 will be progressively increased and the reluctance of the magnetic circuit for the coil 102 will be progressively reduced, with the result that the proportions of the primary applied voltage appearing across the coils 101 and 102 are respectively progressively reduced and increased. Consequently the voltages induced in the secondary coils 105 and 106 are progressively reduced and increased respectively until when the core 13 occupies its lowermost position as indicated by the chain lines in Fig. 3 maximum voltage is induced in the coil 106 and only small voltage in the coil 105, the reluctance of the magnetic circuits for the coil 102 being then a minimum whilst the reluctances of the magnetic circuits for the coil 101 are a minimum, so that the primary voltage appears mainly across the primary coil 102 and only a small proportion of said voltage appears at the primary coil 101. Consequently, substantially no voltage is induced in the secondary coil 105 and maximum voltage is induced in the secondary coil 106.

Since the secondary coils 105 and 106 are connected in the secondary circuit (leads 107 and 108) reversely with respect to one another, whilst the primary coils 101 and 102 are connected in the same direction as one another in the primary circuit, the voltage imparted to the conductors 107 and 108 by the coil 106 will be reversed with respect to the voltage imparted to said conductors by the coil 105. Thus, with the core 13 in its lowermost position the leads 107 and 108 and output circuits will again be energised at maximum voltage but in phase opposition to the conditions when the core 13 occupies its uppermost position.

In a central position of the core 13 the primary applied voltage will be equally divided between the two coils 101 and 102 and equal voltages will be induced in the two secondary coils 105 and 106 so that no resultant voltage is imparted to the leads 107 and 108. By movement of the core 13 from its uppermost to its lowermost position the voltage across the leads 107 and 108 may thus be progressively reduced from a maximum value to zero and then increased to a maximum value in counterphase.

As will be appreciated, the ratios of the numbers of turns of the respective pairs of primary and secondary voltages may be chosen to give any required output voltage, whilst the ratio of the numbers of turns of the primary coils may be chosen so as to give the desired variation in the voltage distribution between said coils.

Figure 4:
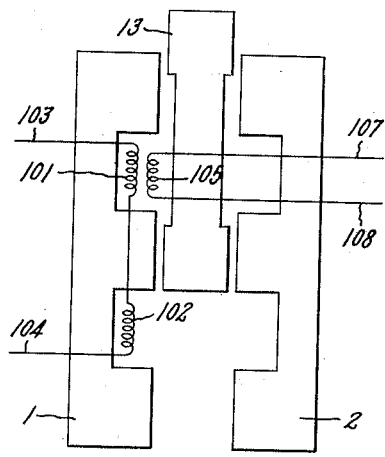

Fig. 4 illustrates a modification of the arrangement of Fig. 3 in which only one secondary coil, 105, is employed, connected directly across the secondary output leads 107 and 108, such arrangement being useful where it is required to obtain at the leads 107 and 108 a voltage progressively adjustable between zero and a maximum value but where it is not required to reverse the phase of the secondary voltage.

Figure 5:
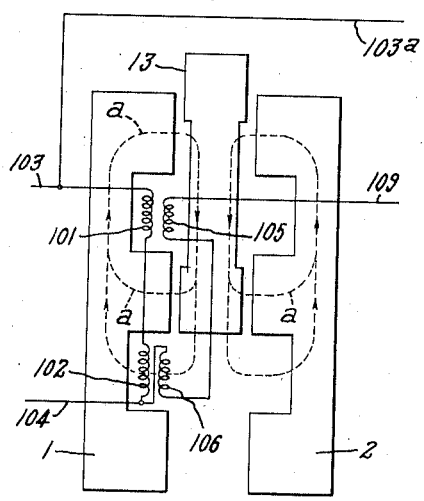
Figure 6:
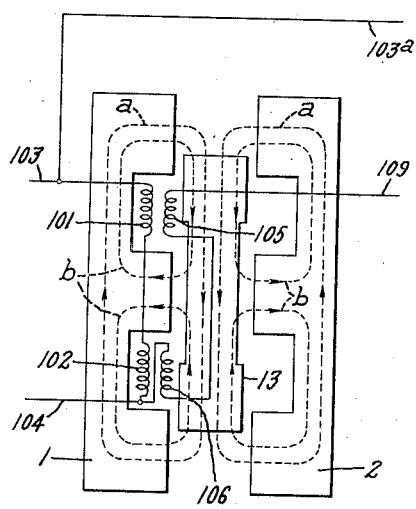

Fig. 5 illustrates a modification of the connections of the secondary coils of an arrangement as in Fig. 4, whereby an adjustable boost and buck of the primary voltage may be obtained. Thus with the arrangement of Fig. 5, the load apparatus (not shown) to be supplied from the conductors 103 and 104 is connected between the leads 103a and 109, the lead 103 being connected directly with the conductor 103 whilst the lead 109 is connected with the conductor 104 through the two secondary coils 105 and 106 in series with one another, said coils 105 and 106 being however connected in opposition with one another between the lead 109 and conductor 104.

Assuming the coils 101 and 105 to be wound in the same direction as one another and the coils 102 and 106 to be wound in the opposite direction to one another, the two primary coils being wound in the same direction as one another, then the coil 105 will produce between the leads 103a and 109 a voltage opposing the voltage across the conductors 103 and 104 and the coil 106 will produce between said leads a voltage assisting the voltage across said conductors. With the core 13 in the uppermost position the coil 105 produces maximum voltage and the coil 106 produces substantially no voltage so that a reduced voltage is obtained across the leads 103a and 109. The voltage across the leads 103a and 109 may be progressively increased by downward movement of the core 13 whereby the voltage induced in the coil 105 is reduced and that induced in the coil 106 is increased, until when the core 13 reaches its central position the voltages induced in the coils 105 and 106 counterbalance one another and the leads 103a and 109 are energised at the voltage of the conductors 103 and 104. Continued downward movement of the core 13 results in the voltage induced in the coil 106 becoming greater than that in the coil 105 so that the voltage applied to the leads 103a and 109 is correspondingly greater than that at which the conductors 103 and 104 are energised. The voltage of the said leads is progressively increased until finally when the core 13 occupies its lowermost position the maximum voltage is obtained.

In cases where it is desired only to obtain boosting of the voltage the coils 105 may be omitted whilst in cores where it is required only to reduce the voltage of the leads 103a and 109 with respect to the input voltage the coil 106 may be omitted.

It has been stated above that the primary coils 101 and 102 are assumed to be wound in the same direction, such arrangement having been found more convenient. It is however possible and within the scope of the invention to arrange said primary coils wound in opposite directions to one another, in which case, as will be appreciated, where there are two secondary coils which are required to produce voltages in opposition to one another, for example as in Figs. 3 and 4, such secondary coils will be wound in the same direction as one another so that said secondary coils are wound in opposite direction with respect to the direction of winding of their respective primary coils. With the primary coils wound in the opposite direction to one another the middle poles of the cores 1 and 2 carry the sum of the fluxes due to said two coils whereas with the latter wound in the same direction said poles carry only the difference of said fluxes.

The purpose of the recesses 29 in the sides of the core 13 as shown in connection with Fig. 1 may now be explained. Considering, for example, the arrangement of Fig. 5, with the core 13 in the illustrated position, and with the leads 103a and 109 open-circuited, the flux paths will be as indicated by the broken lines in Fig. 5, the flux a being due to the coil 101. Similarly, when the core 13 occupies its central position, and again with the leads 103a and 109 open-circuited the flux paths will be as indicated by the broken lines a in Fig. 6, which shows the arrangement of Fig. 5 with the core 13 in the central position. When, however, the leads 103a and 109 are loaded and current flows through the secondary coils 105 and 106, flux will be induced in the middle poles of the cores 1 and 2 as indicated by the broken lines b and with a small air gap between the middle poles and the core 13, the reactance of the coils 105 and 106 to load current may be undesirably high. In order to reduce this reactance, the core 13 is provided with the recesses 29 (Fig. 1) which are located adjacent the middle poles in the mid-position of the core 13, whilst still retaining desirably small air gaps between the core 13 and the operative poles of the fixed cores 1 and 2 when the core 13 occupies either extreme position.

As will be appreciated, although in Figs. 1 to 6 the fixed cores 1 and 2 are shown as having three poles each, with the windings disposed in the two slots formed by said poles, it is within the scope of the invention to arrange said cores with any greater number of poles and slots as may be desired.

Figure 7:
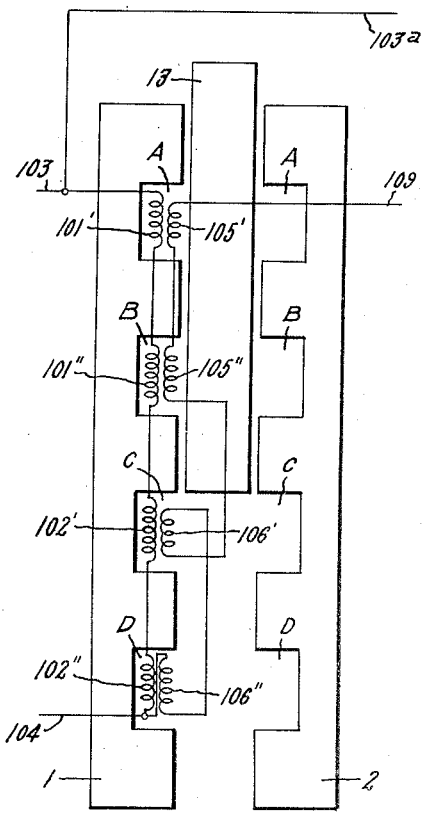
Figure 8:
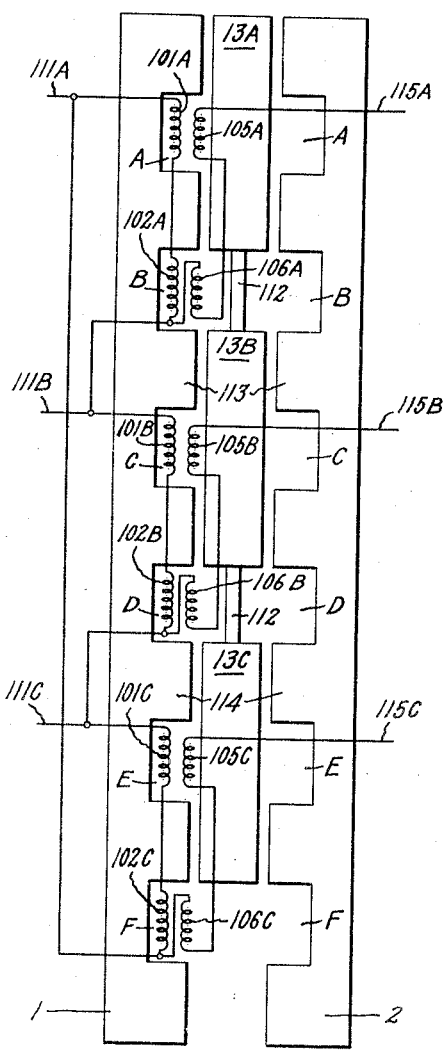

By way of example an arrangement employing four slots A, B, C and D in said cores is shown diagrammatically in Fig. 8, the arrangement of windings corresponding, also by way of example, with that of Fig. 5. In the arrangement of Fig. 7, the primary coil 101 is subdivided into two sections 101' and 101" disposed respectively in the two upper slots A and B of the cores 1 and 2, and the primary coil 102 is subdivided into two sections 102′ and 102″ disposed respectively in the two lower slots C and D of the cores 1 and 2. Similarly, the secondary coil 105 is subdivided into two sections 105′ and 105″ and the secondary coil 106 is subdivided into two sections 106′ and 106″, the sections 105′, 105″, 106′ and 106″ being disposed in the same slots as the primary coil sections 101′, 101″, 102′ and 102″ respectively, so as to be closely electromagnetically coupled respectively with the latter. The moving core is of sufficient length so as in its extreme position to bridge between the uppermost pole and the centre pole on the one hand, and the centre pole and the lowermost pole on the other hand. Thus, in the uppermost position of the core 13 substantially the whole of the primary applied voltage appears across the coil sections 101′ and 101″, whilst in the lowermost position of the core 13 substantially the whole of said voltage appears across the coil sections 102′ and 102″. In the centre position of the core 13 substantially the whole of the primary applied voltage appears across the coil sections 101″ and 102′, being equally distributed therebetween. As will be appreciated, the four secondary coil sections may be connected in any other desired manner, for example to correspond with Fig. 3, or only one set of coil sections, such as 105′ and 105″, or 106′ and 106″ may be provided, where only one secondary coil is required such as in Fig. 4.

In applying regulators according to the invention in polyphase systems a group of regulators each as hereinbefore described may be employed, one regulator for each phase, with means for simultaneously adjusting the movable cores of the several regulators. For example, a three-phase regulator may comprise three regulators, each as described with reference to Figs. 1 and 2, with the three spindles geared together for simultaneous movement from a common operating member. In another arrangement the fixed cores of a single regulator are provided with slots accommodating the windings of the several phases and a plurality of moving cores, one for each phase, forming a single moving system, are disposed in line with one another and spaced along the central space between the fixed cores. The arrangement may be such that certain of the poles on the fixed cores are common to two of the moving cores as in the three-phase embodiment now to be described with reference to Fig. 8. In this arrangement each of the fixed cores 1 and 2 is provided with seven poles and six slots A to F inclusive. In the two upper slots A and B are disposed primary coils 101A and 102A of the first phase, in the two centre slots C and D primary coils 101B and 102B of the second phase and in the bottom two slots E and F two primary coils 101C and 102C of the third phase. These pairs of primary coils are shown as being connected in delta with the three phase conductors 111A, 111B and 111C, although as will be appreciated the said coils may alternatively be connected in star or in any other polyphase manner as may be desired. The adjustment of the voltage distribution across the coils 101A and 102A is obtained by a moving core 13A co-operating with the three upper poles of the fixed cores 1 and 2 whilst the voltage distribution across the coils 101B and 102B is controlled by a moving core 13B co-operating with the three centre poles of the cores 1 and 2 and the voltage distribution across the coils 101C and 102C is controlled by a moving core 13C co-operating with the bottom three poles of the cores 1 and 2. The three moving cores 13A, 13B and 13C are connected directly with one another as indicated at 112 so as all to be movable together as a single moving system. It will be seen that the third pole, designated 113, from the top of each core 1 and 2 is common to both the moving cores 13A and 13B, co-operating with the core 13B in the illustrated upper position of the regulator and with the core 13A in the lowermost position of the regulator. Furthermore, the third pole, designated 114, from the bottom of each fixed core is common to both the sliding cores 13B and 13C, co-operating with the core 13C in the uppermost position of the regulator and with the core 13B in the lowermost position of the regulator.

The regulator of Fig. 8 is shown as provided with two secondary coils for each phase, namely at 105A and 106A; 105B and 106B, and 105C and 106C, which coils are in each phase connected similarly to the secondary coils in the arrangement of Figs. 5 and are respectively connected with three-phase output leads 115A, 115B and 115C as shown, whereby the regulator provides a progressively adjustable buck and boost of the voltage of said output leads with respect to the voltage of the three-phase input conductors 111A, 111B and 111C. Obviously, however, the regulator of Fig. 8 may be employed with any other arrangement of secondary coils, for example corresponding with the other single phase arrangements hereinbefore indicated.

In any polyphase arrangement according to the invention employing either a group of associated separate regulators for the several phases or an arrangement of the kind above described with reference to Fig. 8, the windings may be connected in any desired polyphase manner, and also in some cases a tertiary delta winding may be provided for stabilising the neutral point of the regulator system when a star connection of the windings is employed. This tertiary winding, whether applied to a polyphase group of separate regulators or to unitary polyphase regulators such as that shown in Fig. 8, should preferably be divided with a portion in each slot of the regulator, and forms a delta circuit which may be idle as regards external circuits but which stabilises the neutral point of the main windings.

Figure 9:
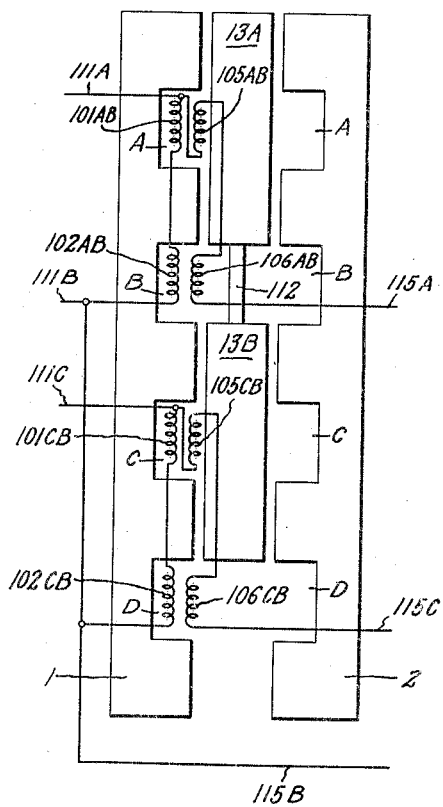

In a modified arrangement of unitary regulator for use with a three-phase system the regulator is provided with two sets of windings which are connected with one another and with the input conductors in open delta formation. With this arrangement, since only two sets of windings are required, the size of the regulator may be reduced. One such embodiment of the invention is shown in Fig. 9, in which secondary coils are again shown by way of example for providing a buck and boost of the voltage of the output leads with respect to the input conductors. In this arrangement, the cores 1 and 2 are each provided with four slots A, B, C and D and primary coils 101AC and 102AC connected between the input conductors 111A and 111B of the three-phase system are disposed in the two top slots whilst primary coils 101CB and 102CB connected between the input conductors 111B and 111C of the three-phase system are disposed in the two bottom slots. Two moving cores 13A and 13B are provided, being connected directly together for simultaneous movement as indicated at 112, the core 13A controlling the distribution of voltage across the coils 101AC and 102AC and the core 13B controlling the distribution of voltage across the coils 101BC and 102BC.

Of the three-phase output leads 115A, 115B and 115C, the last mentioned is connected directly with the junction point of the two pairs of primary coils 101AC and 102AC on the one hand and 101BC and 102BC on the other hand, that is to say, said lead 115C is connected directly with the conductor 111C. The lead 115A is connected through secondary coils 105AC and 106AC, associated respectively with the primary coils 101AC and 102AC, with the conductor 111A, said secondary coils acting in opposition to one another. The lead 115B is connected through secondary coils 105BC and 106BC, associated respectively with the primary coils 101BC and 102BC, with the conductor 111B, said coils 105BC and 106BC also acting in opposition to one another.

Figure 10:
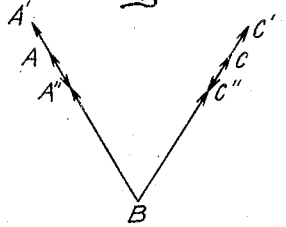

The operation of the regulator of Fig. 9 will be apparent from the vector diagram of Fig. 10, in which the voltage between the conductor 111B and 111A is represented by the vector BA and the voltage between the conductors 111B and 111C is represented by the vector BC. To the vector BA is added the vector AA' representing the difference of the voltages induced in the secondary coils 105AB and 106AB and to the vector BC is added the vector CC' representing the difference of the voltages induced in the secondary coils 105CB and 106CB. The resultant voltage across the output leads 115B and 115A is thus represented by BA' and the voltage across the output leads 115B and 115C is represented by BC'. These conditions correspond with the position of the regulator shown in Fig. 9 in which the primary voltage mainly appears across the primary coils 101AB and 101CB and the output voltages are consequently greater than the input voltages as above set forth. When, however, the position of the cores 13A and 13B is adjusted so that the voltages induced in the coils 106AB and 106CB are greater than those induced in the coils 105AB and 106CB, for example when the cores 13A and 13B occupy their lowermost positions and the input voltages appear mainly across the primary coils 102AB and 102CB, the vectors AA' and CC" are reversed in sense as indicated at AA" and CC" and the resultant voltages across the conductors 115B and 115A on the one hand and the conductors 115B and 115C on the other hand are represented by BA" and BC", being then smaller than the input voltages.

It will also be understood that the various winding arrangements hereinbefore indicated in the foregoing description, although illustrated diagrammatically as being employed in regulators with the same general arrangement of cores as in the embodiment shown in Figs. 1 and 2, may be employed with any other equivalent arrangement of magnetic circuit structure and relatively movable core or cores falling within the scope of the appended claims.

I claim:

1. An alternating current voltage regulator comprising in combination, a primary winding including a plurality of coils connected in series, a magnetic circuit structure providing independent magnetic circuits for said coils, said structure having relatively movable members of magnetic material forming part of the magnetic circuits for each primary coil and being operative to vary the relative reluctances of each of said magnetic circuits whereby the relative voltage distribution across said primary coils may be adjusted by relative movement across the parts of said structure, and two secondary coils which are relatively closely electromagnetically coupled by said magnetic structure to said primary coils respectively, said secondary coils being connected in such directions with respect to one another that the voltages induced in said secondary coils are in opposition to one another whereby the voltage imparted to a secondary circuit by the secondary coils may be adjusted and reversed in phase by relative movement between the parts of the magnetic circuit structure.

2. An alternating current voltage regulator comprising in combination, a primary winding including a plurality of coils connected in series, a magnetic circuit structure providing independent magnetic circuits for said coils, said structure having relatively movable members of magnetic material forming part of the magnetic circuits for each primary coil and being operative to vary the relative reluctances of each of said magnetic circuits whereby the relative voltage distribution across said primary coils may be adjusted by relative movement across the parts of said structure, and two secondary coils which are relatively closely electromagnetically coupled by said magnetic structure to said primary coils respectively, said secondary coils being in a secondary circuit which is connected across said primary coils whereby the voltage imparted to the secondary circuit by the secondary coils may be raised above and lowered below the voltage across said primary coils by relative movement between the parts of the magnetic circuit structure.

3. An alternating current voltage regulator comprising in combination, a primary winding including a plurality of coils connected in series, a magnetic circuit structure providing independent magnetic circuits for said coils, said structure comprising a plurality of cores provided with poles projecting towards a central space between said cores in which space is located a core member of magnetic material adapted variably to bridge the gaps between said poles, said member being provided with recesses disposed between its ends, a secondary winding including a coil closely electromagnetically coupled by said magnetic circuit structure with a coil of said primary winding, said primary and secondary coils being disposed in the slots between said poles and surrounding the path of movement of said core member, and means for effecting relative movement between said core member and said poles along said central space so as to change the reluctances of the magnetic circuits of said primary coils with respect to one another and thereby to adjust the distribution of the voltage between said primary coils.

4. An alternating current voltage regulator for a three-phase circuit comprising, a pair of windings connected in series between two of the phase conductors of said circuit, a second pair of windings connected in series between the remaining phase conductor of said circuit and a point on the circuit of the first-mentioned pair of windings, means for simultaneously oppositely varying the reluctance of the magnetic circuits of the windings constituting each pair, and a third pair of windings closely electromagnetically coupled respectively with one of the windings of the first and second pair of windings, said third pair of windings being so connected that voltage variations therein vary symmetrically the voltage of a three-phase circuit.

JOHN BENTLEY HANSELL.